US010013926B2

(12) United States Patent
Kim et al.

(10) Patent No.: US 10,013,926 B2
(45) Date of Patent: Jul. 3, 2018

(54) DISPLAY APPARATUS AND METHOD OF DRIVING THE SAME

(71) Applicant: Samsung Display Co., LTD., Yongin,Gyeonggi-Do (KR)

(72) Inventors: Hyuk-Hwan Kim, Hwaseong-si (KR); Jae-Sul An, Hwaseong-si (KR); Hyun-Jeong Kim, Hwaseong-si (KR); Seok-Hyun Nam, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 624 days.

(21) Appl. No.: 14/514,945

(22) Filed: Oct. 15, 2014

(65) Prior Publication Data

US 2015/0116381 A1 Apr. 30, 2015

(30) Foreign Application Priority Data

Oct. 28, 2013 (KR) ........................ 10-2013-0128670

(51) Int. Cl.

| | |
|---|---|
| ***G06F 1/00*** | (2006.01) |
| ***G09G 3/34*** | (2006.01) |
| ***G09G 3/36*** | (2006.01) |

(52) U.S. Cl.
CPC ......... *G09G 3/3413* (2013.01); *G09G 3/3607* (2013.01); *G09G 2300/0452* (2013.01); *G09G 2310/0235* (2013.01)

(58) Field of Classification Search
CPC ... G09G 3/3413; G09G 5/10; G02F 1/133603
See application file for complete search history.

(56) References Cited

U.S. PATENT DOCUMENTS

| | | | |
|---|---|---|---|
| 6,734,841 B1 | 5/2004 | Seibold et al. | |
| 6,768,525 B2 | 7/2004 | Paolini et al. | |
| 8,193,721 B2 * | 6/2012 | Cho | G02F 1/133603 315/185 R |
| 2012/0320103 A1 * | 12/2012 | Jesme | G09G 3/3413 345/690 |

FOREIGN PATENT DOCUMENTS

| | | |
|---|---|---|
| JP | 2010170044 B2 | 8/2010 |
| JP | 2011128562 A | 6/2011 |
| KR | 1020130070041 A | 6/2013 |

* cited by examiner

*Primary Examiner* — Michael Faragalla
(74) *Attorney, Agent, or Firm* — Cantor Colburn LLP

(57) ABSTRACT

A display apparatus includes a display panel including a plurality of subpixels, where each subpixel includes one of a first color filter having a first primary color, a second color filter having a second primary color and a third color filter having a third primary color, and a light source part which provides light to the display panel, where the light source part includes a first light source which generates a first light having the first primary color and a second light source which generates a second light having a mixed color of the second primary color and the third primary color, where the first light source and the second light source are alternately in a turned-on state.

14 Claims, 7 Drawing Sheets

DISPLAY APPARATUS AND METHOD OF DRIVING THE SAME

This application claims priority to Korean Patent Application No. 10-2013-0128670, filed on Oct. 28, 2013, and all the benefits accruing therefrom under 35 U.S.C. § 119, the contents of which in its entirety is herein incorporated by reference.

BACKGROUND

1. Field

Exemplary embodiments of the invention relate to a display apparatus and a method of driving the display apparatus. More particularly, exemplary embodiments of the invention relate to a display apparatus with improved color reproduction ratio and a method of driving the display apparatus.

2. Description of the Related Art

Generally, a liquid crystal display apparatus includes a liquid crystal display panel that displays an image by controlling a light transmittance of a liquid crystal layer therein and a light source module that provides light to the liquid crystal display panel. In such a liquid crystal display apparatus, the light source module may be a backlight assembly, for example.

The liquid crystal display panel typically includes a first substrate including pixel electrodes and thin film transistors connected to the pixel electrodes, a second substrate including a common electrode and color filters, and a liquid crystal layer disposed between the first and second substrates.

The light source module typically includes a plurality of light sources that generates light used to display an image on the liquid crystal display panel. The light sources may include a cold cathode fluorescent lamp ("CCFL"), an external electrode fluorescent lamp ("EEFL"), a flat fluorescent lamp ("FFL"), or a light emitting diode ("LED"), for example.

A display apparatus having a relatively high color reproduction ratio has been developed on consumer's demand. When the light source module increases all of a red LED chip to generate a red light, a green LED chip to generate a green light and a blue LED chip to generate a green light, the display apparatus may have a high color reproduction ratio. However, a cost for manufacturing the light source module may increase.

When transmission spectrums of a red color filter, a green color filter and a blue color filter of the liquid crystal panel are improved, color purity of a red pixel, a green pixel and a blue pixel may be improved. However, an improvement of the color reproduction ratio by improving the transmission spectrums of a red color filter, a green color filter and a blue color filter of the liquid crystal panel may be limited to a certain level.

SUMMARY

Exemplary embodiments of the invention provide a display apparatus with improved color reproduction ratio using light sources having different colors which are alternately in a turned-on state without an increase of a manufacturing cost.

Exemplary embodiments of the invention also provide a method of driving the display apparatus.

In an exemplary embodiment of a display apparatus, according to the invention, the display apparatus includes a display panel including a plurality of subpixels, where each subpixel includes one of a first color filter having a first primary color, a second color filter having a second primary color and a third color filter having a third primary color, and a light source part which provides light to the display panel, where the light source part includes a first light source which generates a first light having the first primary color and a second light source which generates a second light having a mixed color of the second primary color and the third primary color, where the first light source and the second light source are alternately in a turned-on state.

In an exemplary embodiment, the first light source may be in the turned-on state and the second light source may be in a turned-off state during a first subframe, such that a first subpixel including the first color filter having the first primary color may represent a grayscale of the first primary color and a second subpixel including the second color filter having the second primary color and a third subpixel including the third color filter having the third primary color may represent a black grayscale during the first subframe.

In an exemplary embodiment, the second light source may be in the turned-on state and the first light source may be in the turned-off state during a second subframe, such that the second subpixel may represent a grayscale of the second primary color and the first subpixel and the third subpixel may represent the black grayscale during the second subframe.

In an exemplary embodiment, the first primary color may be green, the second primary color may be red, the third primary color may be blue, and the mixed color may be magenta.

In an exemplary embodiment, the first light source may include a first blue light emitting diode ("LED") chip and a green phosphor, and the second light source may include a second blue LED chip and a red phosphor.

In an exemplary embodiment, a density of the green phosphor may be greater than a density of the red phosphor.

In an exemplary embodiment, a peak wavelength of the green phosphor may be equal to or less than about 540 nanometers (nm), and a peak wavelength of the red phosphor may be equal to or greater than about 630 nm.

In an exemplary embodiment, the first primary color may be red, the second primary color may be green, the third primary color may be blue, and the mixed color may be cyan.

In an exemplary embodiment, the first light source may include a first blue LED chip and a red phosphor, and the second light source may include a second blue LED chip and a green phosphor.

In an exemplary embodiment, a density of the red phosphor may be greater than a density of the green phosphor.

In an exemplary embodiment, a peak wavelength of the green phosphor may be equal to or less than about 540 nm, and a peak wavelength of the red phosphor is equal to or greater than about 630 nm.

In an exemplary embodiment of a method of driving the display apparatus, according to the invention, the method includes setting grayscale data of a first subpixel of the display apparatus, which includes a first color filter having a first primary color, setting grayscale data of a second subpixel of the display apparatus, which includes a second color filter having a second primary color and setting grayscale data of a third subpixel of the display apparatus, which includes a third color filter having a third primary color and alternately turning on a first light source of the display apparatus, which generates a first light having the first primary color, and a second light source of the display apparatus, which generates a second light having a mixed color of the second primary color and the third primary color.

In an exemplary embodiment, the alternately turning on the first light source and the second light source may include turning on the first light source and turning off the second light source during a first subframe, such that the first subpixel represents a grayscale of the first primary color and the second subpixel and the third subpixel represent a black grayscale during the first subframe.

In an exemplary embodiment, the alternately turning on the first light source and the second light source may further include turning on the second light source and turning off the first light source during a second subframe, such that the second subpixel represents a grayscale of the second primary color and the first subpixel and the third subpixel represent the black grayscale during the second subframe.

In an exemplary embodiment, the first primary color may be green, the second primary color may be red, the third primary color may be blue, and the mixed color may be magenta.

In an exemplary embodiment, the first light source may include a first blue LED chip and a green phosphor, and the second light source may include a second blue LED chip and a red phosphor.

In an exemplary embodiment, the first primary color may be red, the second primary color may be green, the third primary color may be blue, and the mixed color may be cyan.

In an exemplary embodiment, the first light source may include a first blue LED chip and a red phosphor, and the second light source may include a second blue LED chip and a green phosphor.

According to exemplary embodiments of the display apparatus and the method of driving the display apparatus, the display panel includes a first color filter, a second color filter and a third color filter and the light source part include a first light source and a second light source which are alternately in a turned-on state such that a color reproduction ratio of the display panel may be improved without an increase of a manufacturing cost.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

Figure 1:
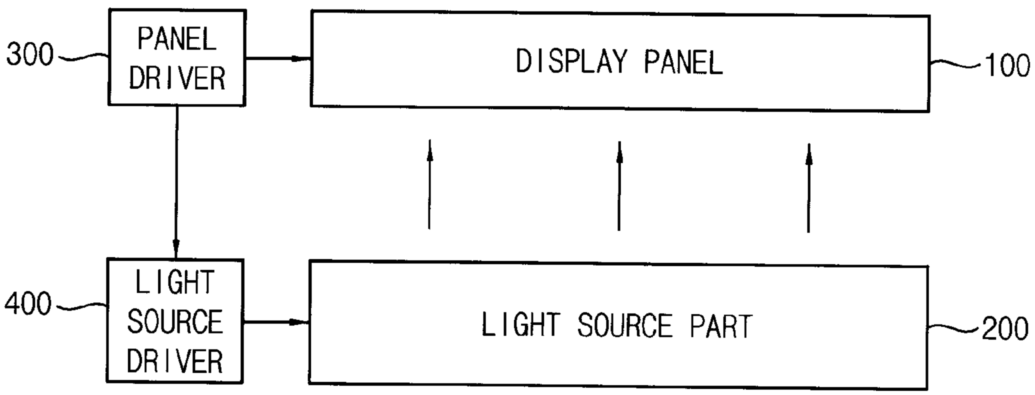
FIG. 1 is a block diagram illustrating an exemplary embodiment of a display apparatus, according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper,"

depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described in further detail with reference to the accompanying drawings.

Figure 2:
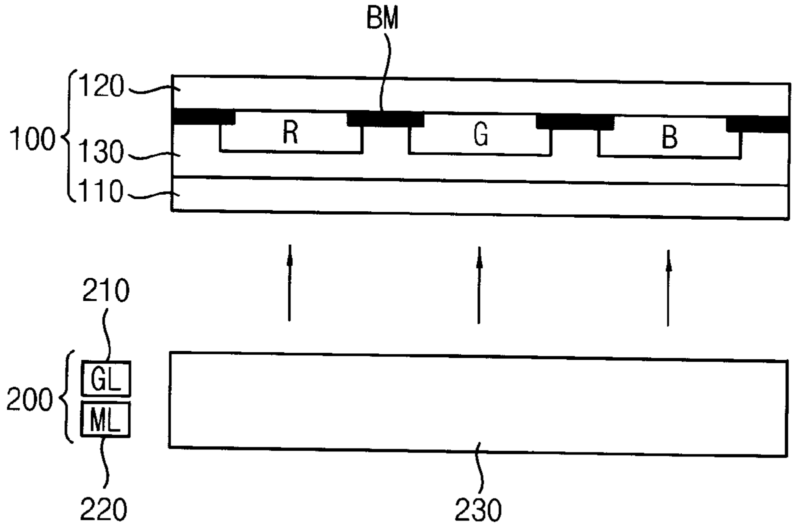
FIG. 2 is a cross-sectional view of an exemplary embodiment of a display panel and a light source part of FIG. 1.
Figure 3A:
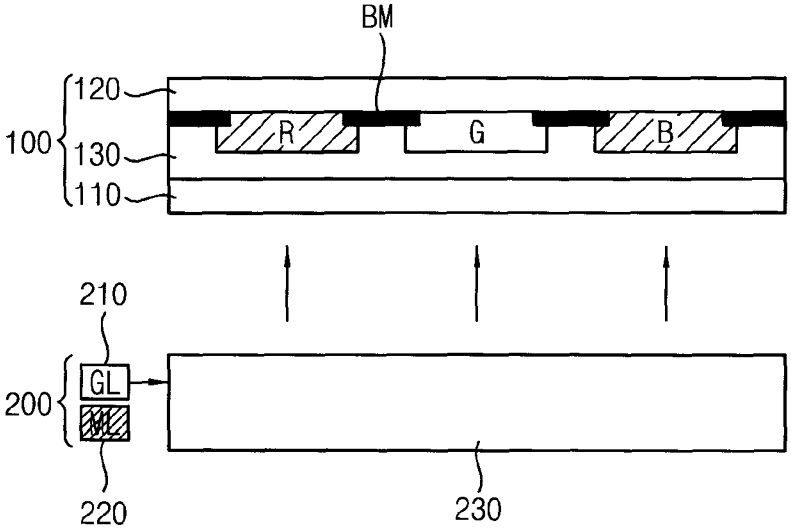
FIG. 3A is a cross-sectional view of the display panel and the light source part of FIG. 1 in a first subframe.
Figure 3B:
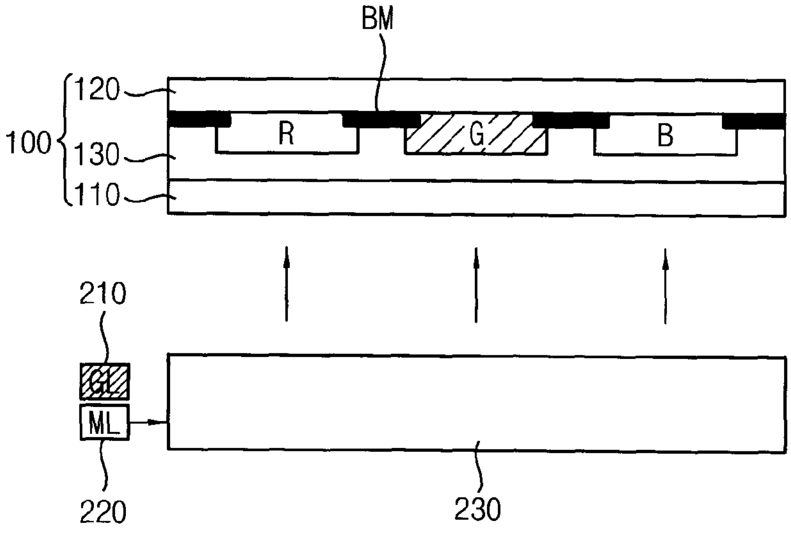
FIG. 3B is a cross-sectional view of the display panel and the light source part of FIG. 1 in a second subframe.

FIG. 1 is a block diagram illustrating an exemplary embodiment of a display apparatus, according to the invention. FIG. 2 is a cross-sectional view of an exemplary embodiment of a display panel and a light source part of FIG. 1. FIG. 3A is a cross-sectional view of the display panel and the light source part of FIG. 1 in a first subframe. FIG. 3B is a cross-sectional view of the display panel and the light source part of FIG. 1 in a second subframe.

Referring to FIGS. 1, 2, 3A and 3B, an exemplary embodiment of the display apparatus includes a display panel 100, a light source part 200, a panel driver 300 and a light source driver 400.

The display panel 100 displays an image. The display panel 100 includes a first substrate 110, a second substrate 120 disposed opposite to the first substrate and a liquid crystal layer 130 disposed between the first and second substrates 110 and 120.

In an exemplary embodiment, as shown in FIG. 2, the display panel 100 includes a first subpixel R having a first primary color, a second subpixel G having a second primary color and a third subpixel B having a third primary color.

In an exemplary embodiment, the first primary color is red, the second primary color is green, and the third primary color is blue. In such an embodiment, the first subpixel R is a red subpixel, the second subpixel G is a green subpixel, and the third subpixel B is a blue subpixel.

The first substrate 110 may be a thin film transistor ("TFT") substrate including a plurality of TFTs (not shown). The first substrate 110 may further include a plurality of gate lines extending substantially in a first direction and a plurality of data lines extending substantially in a second direction crossing the first direction. The first substrate 110 may further include a pixel electrode.

The second substrate 120 faces the first substrate 110. The second substrate 120 may be a color filter substrate including a plurality of color filters. The second substrate may further include a common electrode.

The first subpixel R may be defined by a red color filter disposed on the second substrate 120. The second subpixel G may be defined by a green color filter disposed on the second substrate 120. The third subpixel B may be defined by a blue color filter disposed on the second substrate 120. A light blocking pattern BM may be disposed between the color filters.

The liquid crystal layer 130 is disposed between the first and second substrates 110 and 120.

In FIG. 2, one red subpixel R, one green subpixel G and one blue subpixel B are shown for convenience of illustration, but the invention is limited thereto. In an exemplary embodiment, the display panel 100 may include a plurality of red subpixels R, a plurality of green subpixels G and a plurality of blue subpixels B.

In an exemplary embodiment, the color filters are disposed on the second substrate 120 as shown in FIG. 2, but the invention is not limited thereto. In an alternative exemplary embodiment, the color filters may be disposed on the first substrate 110 including the thin film transistors.

The panel driver 300 is connected to the display panel 100 to drive the display panel 100. The panel driver 300 may include a timing controller, a gate driver and a data driver.

The timing controller generates a first control signal to control a driving timing of the gate driver, and outputs the first control signal to the gate driver. The timing controller generates a second control signal to control a driving timing of the data driver, and outputs the second control signal to the data driver. The gate driver outputs a gate signal to the gate lines of the display panel 100. The data driver outputs a data signal to the data lines of the display panel 100.

The panel driver 300 sets grayscale data of the first, second and third subpixels R, G and B.

The panel driver 300 generates a light source control signal to control a driving timing of the light source driver 400, and outputs the light source control signal to the light source driver 400. The panel driver 300 may be synchronized with the light source driver 400.

The light source part 200 generates light and provides the light to the display panel 100. The light source part 200 includes a first light source 210 and a second light source 220. In an exemplary embodiment, as shown in FIG. 2, the light source part 200 may be an edge type backlight assembly. In such an embodiment, the first light source 210 and the second light source 220 are alternately turned on, that is, in a turned-on state.

The light source part 200 may further include a light guide plate 230. The light guide plate 230 guides the light generated from the first light source 210 and the second light source 220 to the display panel 100.

The first light source 210 may generate one of light having the first primary color, light having the second primary color and light having the third primary color.

The second light source 220 may generate mixed light of two primary colors. In one exemplary embodiment, for example, when the first light source 210 generates light having the first primary color, the second light source 220 may generate mixed light of the second primary color and the third primary color.

In an exemplary embodiment, the first light source 210 generates a green light. The second light source 220 generates a magenta light which is mixed light of a red light and a blue light.

When the light having the first primary color, the light having the second primary color and the light having the third primary color are mixed one another, the mixed light represents white. In an exemplary embodiment, as described above, the first to third primary colors may be red, green and blue, respectively, but the invention is not limited thereto.

In an exemplary embodiment, the first light source 210 and the second light source 220 may be disposed in a first side of the light guide plate 230. In an alternative exemplary embodiment, the first light source 210 and the second light source 220 may be disposed opposing sides of the light guide plate 230 facing each other. In another alternative exemplary embodiment, the first light source 210 and the second light source 220 may be disposed four sides of the light guide plate 230 facing one another.

A structure of the first light source 210 will be described later in detail referring to FIG. 4. A structure of the second light source 220 will be described later in detail referring to FIG. 5.

In an exemplary embodiment, the display apparatus may be the liquid crystal display apparatus including the liquid crystal layer 130, but the invention is not limited thereto. In an alternative exemplary embodiment, the display apparatus may be an organic light emitting diode ("OLED") display apparatus including the OLEDs.

The light source driver 400 is connected to the light source part 200. The light source driver 400 drives the light source part 200. The light source driver 400 alternately turns on the first and second light sources 210 and 220. In one exemplary embodiment, for example, the first light source 210 is turned on and the second light source 220 is turned off by the light source driver 400 during a first subframe. In one exemplary embodiment, for example, the first light source 210 is turned off and the second light source 220 is turned on by the light source driver 400 during a second subframe.

A duration of the first subframe may be substantially equal to a duration of the second subframe. Alternatively, a duration of the first subframe may be different from a duration of the second subframe.

In one exemplary embodiment, for example, the display panel 100 may display the images in a frame rate of 120 hertz (Hz). The light source driver 400 may alternately turn on the first and second light sources 210 and 220 in a frequency of 120 Hz.

The panel driver 300 sets the grayscale data of the first subpixel R, the second subpixel G and the third subpixel B.

During the first subframe, when the first light source 210, which generates the green light, is in a turned on state, the second subpixel G may represent a green grayscale. During the first subframe, the first subpixel R and the third subpixel B may be in a turned-off state. In one exemplary embodiment, for example, the first subpixel R and the third subpixel B may represent black grayscales during the first subframe.

In general, the green light generated from the first light source 210 may be substantially blocked by the red color filter of the first subpixel R and the blue color filter of the third subpixel B. However, when a little portion of the green light generated from the first light source 210 passes through the red color filter of the first subpixel R and the blue color filter of the third subpixel B, a color purity of the green light decreases. Thus, a color reproduction ratio of the display panel 100 may be decreased.

In an exemplary embodiment, during the first subframe, when the first light source 210 that generates the green light is a turned-on state, the first subpixel R and the third subpixel B are in a turned-off state. Thus, the color purity may not be decreased.

During the second subframe, when the second light source 220 generating the magenta light which is a mixed light of the red light and the blue right is a turned-on state, the first subpixel R and the blue subpixel B may represent a red grayscale and a blue grayscale. During the second subframe, the second subpixel G may be in a turned-off state. In one exemplary embodiment, for example, the second subpixel G may represent black grayscale during the second subframe.

In general, the magenta light generated from the second light source 220 rarely passes the green color filter of the second subpixel G. However, when a little portion of the magenta light generated from the second light source 220 passes through the green color filter of the second subpixel G, color purities of the red light and the blue right decrease. Thus, a color reproduction ratio of the display panel 100 may be decreased.

In an exemplary embodiment, during the second subframe, when the second light source 220 that generates the magenta light is in a turned-on state, the second subpixel G is a turned-off state. Thus, the color purity may not be decreased.

Figure 4:
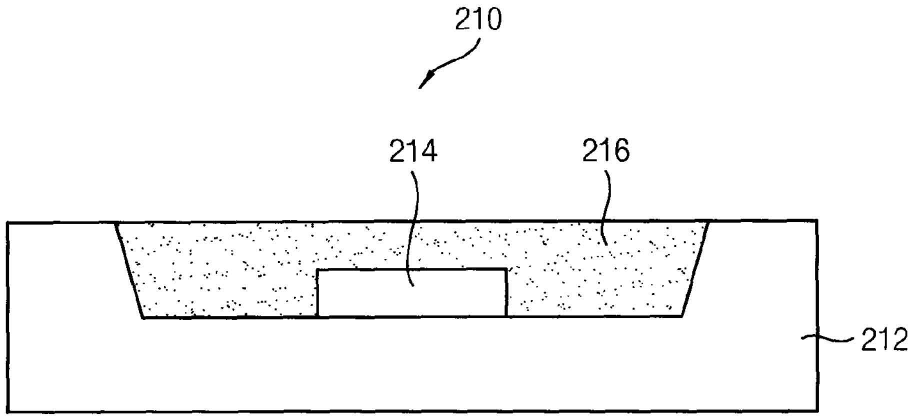
FIG. 4 is a cross-sectional view of an exemplary embodiment of a first light source of FIG. 2.
Figure 5:
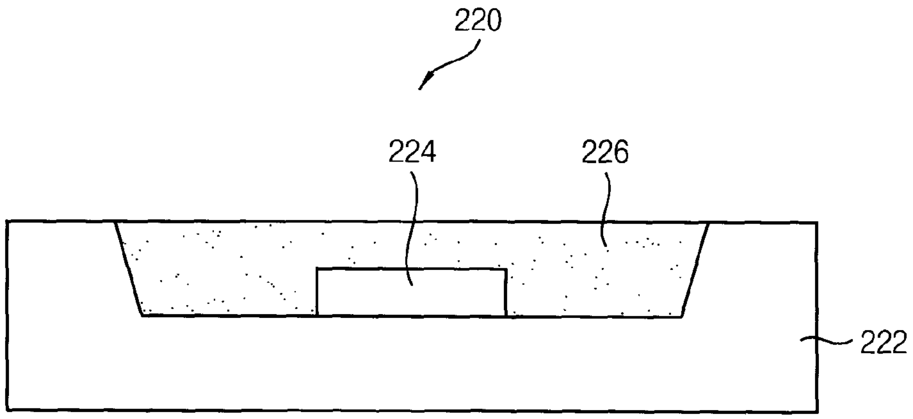
FIG. 5 is a cross-sectional view of an exemplary embodiment of a second light source of FIG. 2.

FIG. 4 is a cross-sectional view of an exemplary embodiment of the first light source 210 of FIG. 2. FIG. 5 is a cross-sectional view of an exemplary embodiment of the second light source 220 of FIG. 2.

Referring to FIGS. 1 to 5, the first light source 210 includes a first receiving container 212, a first LED chip 214 and a first phosphor 216. In an exemplary embodiment, the first light source 210 emits the green light.

The first receiving container 212 receives the first LED chip 214 and the first phosphor 216. The first receiving container 212 includes an upper surface and a bottom surface.

The first LED chip 214 is disposed on the bottom surface of the first receiving container 212. In an exemplary embodiment, the first LED chip 214 may be a blue LED chip.

The first phosphor 216 fills a receiving area formed between the upper surface and the bottom surface of the first receiving container 212. In an exemplary embodiment, the first phosphor 216 may be a green phosphor. The first phosphor 216 may have an extremely high density such that an emission of the blue light of the first LED chip may be effectively minimized.

In one exemplary embodiment, for example, the first phosphor 216 may be a nitride phosphor. In one exemplary embodiment, for example, the first phosphor 216 may be a silicate phosphor.

The second light source 220 includes a second receiving container 222, a second LED chip 224 and a second phosphor 226. In an exemplary embodiment, the second light source 220 emits the magenta light.

The second receiving container 222 receives the second LED chip 224 and the second phosphor 226. The second receiving container 222 includes an upper surface and a bottom surface.

The second LED chip 224 is disposed on the bottom surface of the second receiving container 222. In an exemplary embodiment, the second LED chip 224 may be a blue LED chip.

The second phosphor 226 fills a receiving area formed between the upper surface and the bottom surface of the second receiving container 222. In an exemplary embodiment, the second phosphor 226 may be a red phosphor. The second LED chip 224 generates the blue light, and the second phosphor 226 generates a red light based on the blue light. The blue light of the second LED chip 224 and the red light of the second phosphor 226 are mixed such that the second light source 220 emits the magenta light.

In one exemplary embodiment, for example, a density of the second phosphor 226 may be less than the density of the density of the first phosphor 224.

In one exemplary embodiment, for example, the second phosphor 226 may be a nitride phosphor. In one exemplary embodiment, for example, the second phosphor 226 may be a silicate phosphor.

In an exemplary embodiment, a peak wavelength of the first phosphor 216 may be equal to or less than about 540 nanometers (nm). A peak wavelength of the second phosphor 226 may be equal to or greater than about 630 nm. Accordingly, an overlapping region between the wavelength of the first phosphor 216 and the wavelength of the second phosphor 226 is relatively narrow. Thus, the green light of the first light source 210 and the magenta light of the second light source 220 may not be mixed such that the color reproduction ratio of the display panel 100 may increase.

According to an exemplary embodiment, the display panel 100 includes the red color filter, the green color filter and the blue color filter, and the light source part 200 includes the green light source GL and the magenta light source ML, which are alternately in a turned-on state, such that the color reproduction ratio of the display panel 100 may increase. The display panel 100 may have an Adobe concordance rate of about 94.8% and digital cinema initiative ("DCI") concordance rate of about 97.8%.

In such an embodiment, the first light source 210 and the second light source 220 of the light source part 200 include the blue LED chip and do not include a red LED chip and a green LED chip such that a manufacturing cost of the light source part 200 may decrease.

Figure 6:
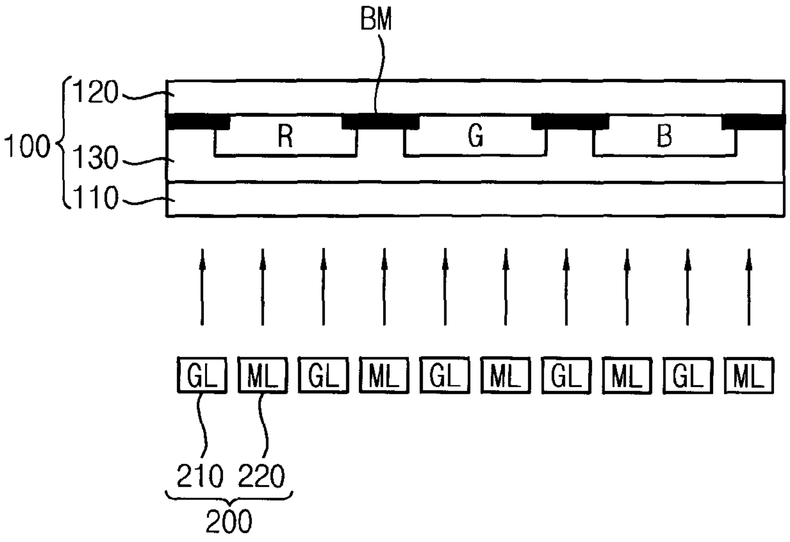
FIG. 6 is a cross-sectional view of an alternative exemplary embodiment of a display panel and a light source part, according to the invention.
Figure 7A:
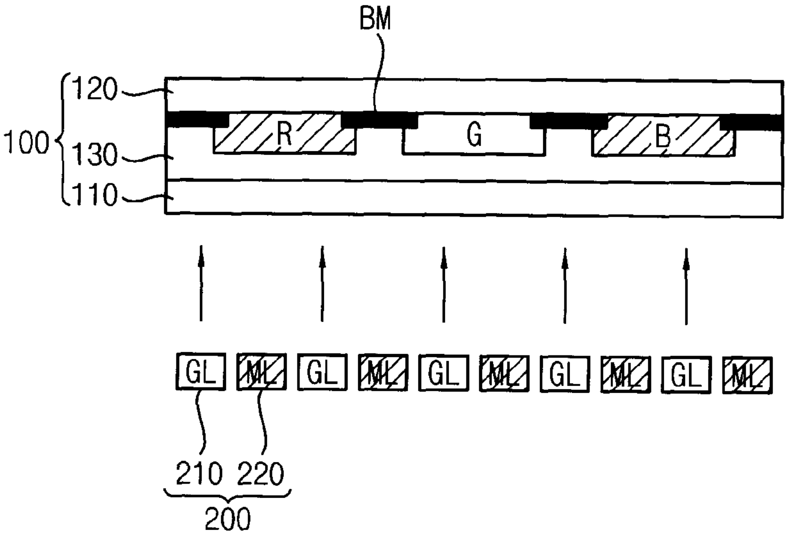
FIG. 7A is a cross-sectional view of the display panel and the light source part of FIG. 6 in a first subframe.
Figure 7B:
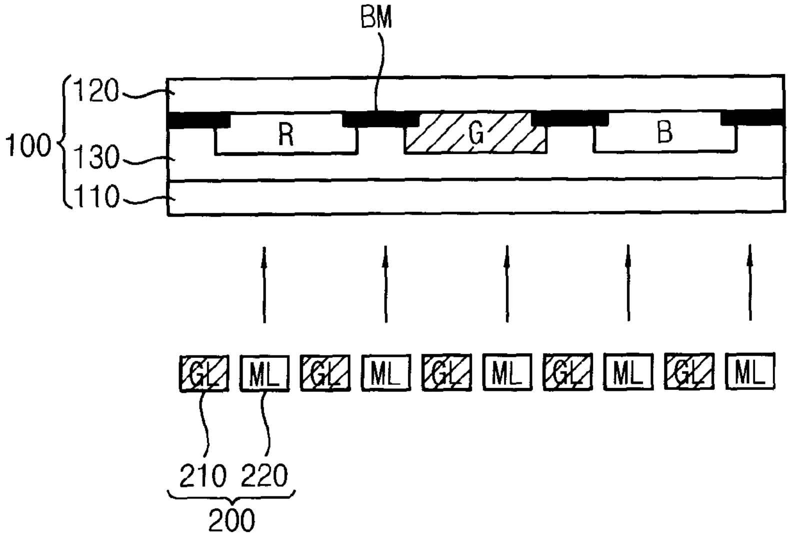
FIG. 7B is a cross-sectional view of the display panel and the light source part of FIG. 6 in a second subframe.

FIG. 6 is a cross-sectional view of a display panel and a light source part, according to the invention. FIG. 7A is a cross-sectional view of the display panel and the light source part of FIG. 6 in a first subframe. FIG. 7B is a cross-sectional view of the display panel and the light source part of FIG. 6 in a second subframe.

The display apparatus and the method of driving the display apparatus shown in FIGS. 6 to 7B are substantially the same as the display apparatus and the method of driving the display apparatus shown in FIGS. 1 to 5 except that the light source part is a direct type backlight assembly. The same or like elements shown in FIGS. 6 to 7B have been labeled with the same reference characters as used above to describe the exemplary embodiments of the display apparatus and the method of driving the display apparatus shown in FIGS. 1 to 5, and any repetitive detailed description thereof will hereinafter be omitted or simplified.

Referring to FIGS. 1, 4 to 6 and 7A and 7B, an exemplary embodiment of the display apparatus includes a display panel 100, a light source part 200, a panel driver 300 and a light source driver 400.

The display panel 100 displays an image. The display panel 100 includes a first substrate 110, a second substrate 120 and a liquid crystal layer 130.

In an exemplary embodiment, the display panel 100 includes a first subpixel R having a first primary color, a second subpixel G having a second primary color and a third subpixel B having a third primary color.

In an exemplary embodiment, as shown in FIG. 6, the first primary color is red, the second primary color is green, and the third primary color is blue. In such an embodiment, the first subpixel R is a red subpixel, the second subpixel G is a green subpixel, and the third subpixel B is a blue subpixel.

The first subpixel R may be defined by a red color filter disposed on the second substrate 120. The second subpixel G may be defined by a green color filter disposed on the second substrate 120. The third subpixel B may be defined by a blue color filter disposed on the second substrate 120. A light blocking pattern BM may be disposed between the color filters.

The panel driver 300 is connected to the display panel 100 to drive the display panel 100. The panel driver 300 may include a timing controller, a gate driver and a data driver.

The panel driver 300 sets grayscale data of the first, second and third subpixels R, G and B.

The panel driver 300 generates a light source control signal to control a driving timing of the light source driver 400, and outputs the light source control signal to the light source driver 400. The panel driver 300 may be synchronized with the light source driver 400.

The light source part 200 generates light and provides the light to the display panel 100. The light source part 200 includes a first light source 210 and a second light source 220. In an exemplary embodiment, as shown in FIG. 6, the light source part 200 may be a direct type backlight assembly. The first light source 210 and the second light source 220 are disposed under the display panel 100 and emit light to the display panel 100. In such an embodiment, the first light source 210 and the second light source 220 are alternately in a turned-on state.

The first light source 210 may generate one of light having the first primary color, light having the second primary color and light having the third primary color.

The second light source 220 may generate mixed light of two primary colors. In one exemplary embodiment, for example, when the first light source 210 generates the light having the first primary color, the second light source 220 may generate mixed light of the second primary color and the third primary color.

In an exemplary embodiment, the first light source 210 generates a green light, and the second light source 220 generates a magenta light which is mixed light of a red light and a blue light.

The light source driver 400 is connected to the light source part 200. The light source driver 400 drives the light source part 200. The light source driver 400 alternately turns on the first and second light sources 210 and 220. In one exemplary embodiment, for example, the first light source 210 is turned on and the second light source 220 is turned off by the light source driver 400 during a first subframe. In one exemplary embodiment, for example, the first light source 210 is turned off and the second light source 220 is turned on by the light source driver 400 during a second subframe.

The panel driver 300 sets the grayscale data of the first subpixel R, the second subpixel G and the third subpixel B.

During the first subframe, when the first light source 210 generating the green light is in a turned-on state, the second subpixel G may represent a green grayscale. During the first subframe, the first subpixel R and the third subpixel B may be in a turned-off state. In one exemplary embodiment, for example, the first subpixel R and the third subpixel B may represent black grayscales during the first subframe.

During the second subframe, when the second light source 220 generating the magenta light which is a mixed light of the red light and the blue right is in a turned-on state, the first subpixel R and the blue subpixel B may represent a red grayscale and a blue grayscale. During the second subframe, the second subpixel G may be in a turned-off state. In one exemplary embodiment, for example, the second subpixel G may represent black grayscale during the second subframe.

According to an exemplary embodiment, the display panel 100 includes the red color filter, the green color filter and the blue color filter and the light source part 200 includes the green light source GL and the magenta light source ML which are alternately in a turned-on state such that the color reproduction ratio of the display panel 100 may increase.

In such an embodiment, the first light source 210 and the second light source 220 of the light source part 200 include the blue LED chip and do not include a red LED chip and a green LED chip such that a manufacturing cost of the light source part 200 may decrease.

Figure 8:
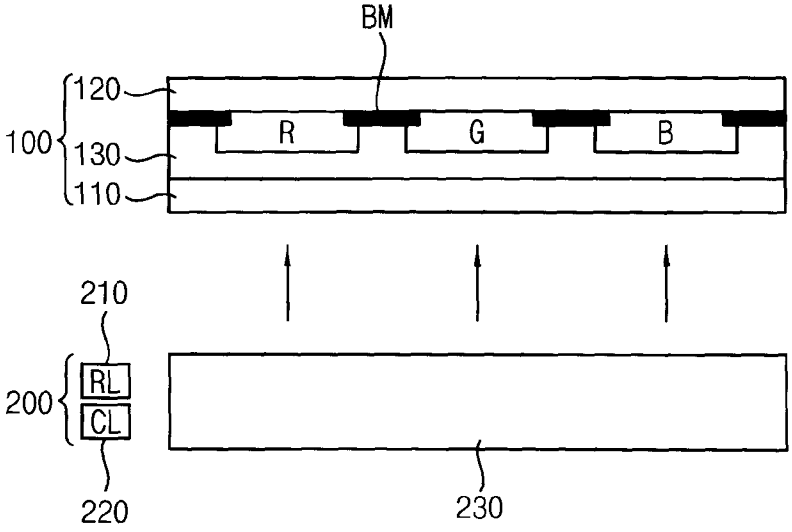
FIG. 8 is a cross-sectional view of another alternative exemplary embodiment of a display panel and a light source part, according to the invention.
Figure 9:
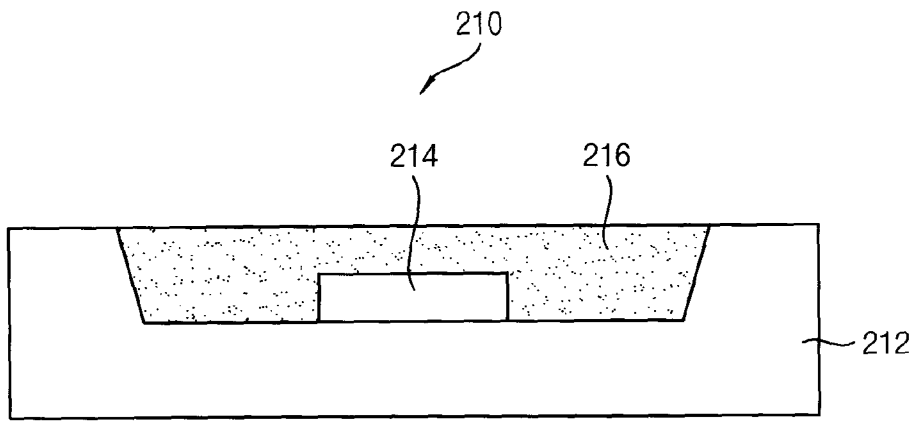
FIG. 9 is a cross-sectional view of an exemplary embodiment of a first light source of FIG. 8.
Figure 10:
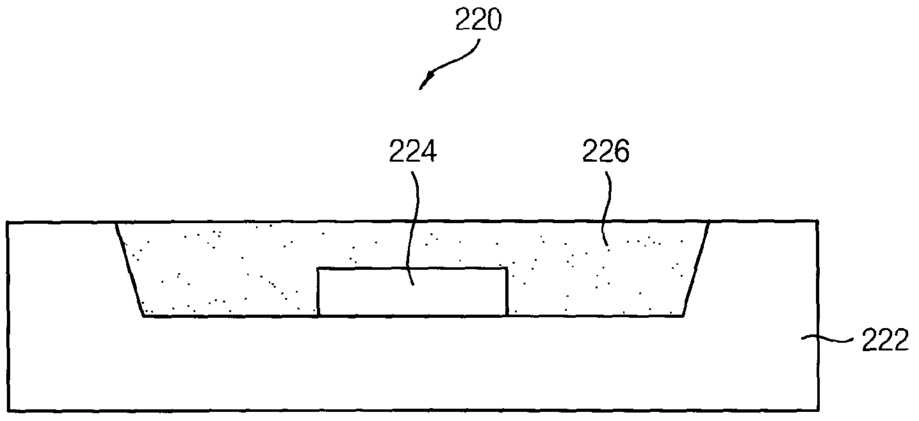
FIG. 10 is a cross-sectional view of an exemplary embodiment of a second light source of FIG. 8.

FIG. 8 is a cross-sectional view of another alternative exemplary embodiment of a display panel and a light source part, according to the invention. FIG. 9 is a cross-sectional view of an exemplary embodiment of a first light source of FIG. 8. FIG. 10 is a cross-sectional view of an exemplary embodiment of a second light source of FIG. 8.

The display apparatus and the method of driving the display apparatus shown in FIGS. 8 to 10 are substantially the same as the display apparatus and the method of driving the display apparatus in FIGS. 1 to 5 except that the first light source 210 generates a red light and the second light source 220 generates a cyan light. The same or like elements shown in FIGS. 8 to 10 have been labeled with the same reference characters as used above to describe the exemplary embodiments of the display apparatus and the method of driving the display apparatus shown in FIGS. 1 to 5, and any repetitive detailed description thereof will hereinafter be omitted or simplified.

Referring to FIGS. 1, 2, 3A, 3B and 8 to 10, an exemplary embodiment of the display apparatus includes a display panel 100, a light source part 200, a panel driver 300 and a light source driver 400.

The display panel 100 displays an image. The display panel 100 includes a first substrate 110, a second substrate 120 and a liquid crystal layer 130.

The display panel 100 includes a first subpixel R having a first primary color, a second subpixel G having a second primary color and a third subpixel B having a third primary color.

In an exemplary embodiment, the first primary color is red, the second primary color is green, and the third primary color is blue. In such an embodiment, the first subpixel R is a red subpixel, the second subpixel G is a green subpixel, and the third subpixel B is a blue subpixel.

The first subpixel R may be defined by a red color filter disposed on the second substrate 120. The second subpixel G may be defined by a green color filter disposed on the second substrate 120. The third subpixel B may be defined by a blue color filter disposed on the second substrate 120. A light blocking pattern BM may be disposed between the color filters.

The panel driver 300 is connected to the display panel 100 to drive the display panel 100. The panel driver 300 may include a timing controller, a gate driver and a data driver.

The panel driver 300 sets grayscale data of the first, second and third subpixels R, G and B.

The panel driver 300 generates a light source control signal to control a driving timing of the light source driver 400, and outputs the light source control signal to the light source driver 400. The panel driver 300 may be synchronized with the light source driver 400.

The light source part 200 generates light and provides the light to the display panel 100. The light source part 200 includes a first light source 210 and a second light source 220. In an exemplary embodiment, as shown in FIG. 8, the light source part 200 may be an edge type backlight assembly. In such an embodiment, the first light source 210 and the second light source 220 are alternately in a turned-on state.

The light source part 200 may further include a light guide plate 230. The light guide plate 230 guides the light generated from the first light source 210 and the second light source 220 to the display panel 100.

The first light source 210 may generate one of light having the first primary color, light having the second primary color and light having the third primary color.

The second light source 220 may generate mixed light of two primary colors. In one exemplary embodiment, for example, when the first light source 210 generates the light having the first primary color, the second light source 220 may generate mixed light of the second primary color and the third primary color.

In an exemplary embodiment, the first light source 210 generates a red light, and the second light source 220 generates a cyan light which is mixed light of a green light and a blue light.

The light source driver 400 is connected to the light source part 200. The light source driver 400 drives the light source part 200. The light source driver 400 alternately turns on the first and second light sources 210 and 220. In one exemplary embodiment, for example, the first light source 210 is in a turned-on state and the second light source 220 is in a turned-off state during a first subframe. In one exemplary embodiment, for example, the first light source 210 is in a turned-off state and the second light source 220 is in a turned-on state during a second subframe.

The panel driver 300 sets the grayscale data of the first subpixel R, the second subpixel G and the third subpixel B.

During the first subframe, when the first light source 210 generating the red light is in a turned-on state, the first subpixel R may represent a blue grayscale. During the first subframe, the second subpixel G and the third subpixel B may be in a turned-off state. In one exemplary embodiment, for example, the second subpixel G and the third subpixel B may represent black grayscales during the first subframe.

During the second subframe, when the second light source 220 generating the cyan light which is a mixed light of the green light and the blue light is in a turned-on state, the second subpixel G and the blue subpixel B may represent a green grayscale and a blue grayscale. During the second sub frame, the first subpixel R may be in a turned-off state. In one exemplary embodiment, for example, the first subpixel R may represent black grayscale during the second subframe.

In an exemplary embodiment, as shown in FIG. 9, the first light source 210 includes a first receiving container 212, a first LED chip 214 and a first phosphor 216. In the exemplary embodiment, the first light source 210 emits the red light.

The first receiving container 212 receives the first LED chip 214 and the first phosphor 216. The first receiving container 212 includes an upper surface and a bottom surface.

The first LED chip 214 is disposed on the bottom surface of the first receiving container 212. In the exemplary embodiment, the first LED chip 214 may be a blue LED chip.

The first phosphor 216 fills a receiving area formed between the upper surface and the bottom surface of the first receiving container 212. In an exemplary embodiment, the first phosphor 216 may be a red phosphor. The first phosphor 216 may have an extremely high density such that an emission of the blue light of the first LED chip may be minimized.

In an exemplary embodiment, as shown in FIG. 10, the second light source 220 includes a second receiving container 222, a second LED chip 224 and a second phosphor 226. In an exemplary embodiment, the second light source 220 emits the cyan light.

The second receiving container 222 receives the second LED chip 224 and the second phosphor 226. The second receiving container 222 includes an upper surface and a bottom surface.

The second LED chip 224 is disposed on the bottom surface of the second receiving container 222. In an exemplary embodiment, the second LED chip 224 may be a blue LED chip.

The second phosphor 226 fills a receiving area formed between the upper surface and the bottom surface of the second receiving container 222. In an exemplary embodiment, the second phosphor 226 may be a green phosphor. The second LED chip 224 generates the blue light and the second phosphor 226 generates a green light based on the blue light. The blue light of the second LED chip 224 and the green light of the second phosphor 226 are mixed such that the second light source 220 emits the cyan light.

In one exemplary embodiment, for example, a density of the second phosphor 226 may be less than the density of the density of the first phosphor 224.

According to an exemplary embodiment, as described above, the display panel 100 includes the red color filter, the green color filter and the blue color filter and the light source part 200 includes the red light source RL and the cyan light source CL which are alternately in a turned-on state such that the color reproduction ratio of the display panel 100 may increase.

In such an embodiment, the first light source 210 and the second light source 220 of the light source part 200 include the blue LED chip and do not include a red LED chip and a green LED chip such that a manufacturing cost of the light source part 200 may decrease.

Figure 11:
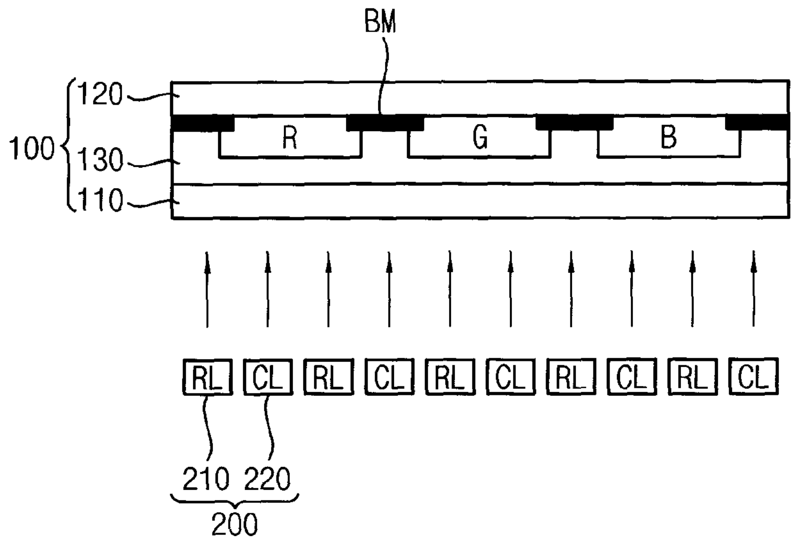
FIG. 11 is a cross-sectional view of another alternative exemplary embodiment of a display panel and a light source part, according to the invention.

FIG. 11 is a cross-sectional view of another alternative exemplary embodiment of a display panel and a light source part, according to the invention.

The display apparatus and the method of driving the display apparatus shown in FIG. 11 are substantially the same as the display apparatus and the method of driving the display apparatus in FIGS. 8 to 10 except that the light source part is a direct type backlight assembly. The same or like elements shown in FIG. 11 have been labeled with the same reference characters as used above to describe the exemplary embodiments of the display apparatus and the method of driving the display apparatus shown in FIGS. 8 to 10, and any repetitive detailed description thereof will hereinafter be omitted or simplified.

Referring to FIGS. 1 and 9 to 11, the display apparatus includes a display panel 100, a light source part 200, a panel driver 300 and a light source driver 400.

The display panel 100 displays an image. The display panel 100 includes a first substrate 110, a second substrate 120 and a liquid crystal layer 130.

In an exemplary embodiment, as shown in FIG. 11, the display panel 100 includes a first subpixel R having a first primary color, a second subpixel G having a second primary color and a third subpixel B having a third primary color.

In an exemplary embodiment, the first primary color is red, the second primary color is green, and the third primary color is blue. In such an embodiment, the first subpixel R is a red subpixel, the second subpixel G is a green subpixel, and the third subpixel B is a blue subpixel.

The first subpixel R may be defined by a red color filter disposed on the second substrate 120. The second subpixel G may be defined by a green color filter disposed on the second substrate 120. The third subpixel B may be defined by a blue color filter disposed on the second substrate 120. A light blocking pattern BM may be disposed between the color filters.

The panel driver 300 is connected to the display panel 100 to drive the display panel 100. The panel driver 300 may include a timing controller, a gate driver and a data driver.

The panel driver 300 sets grayscale data of the first, second and third subpixels R, G and B.

The panel driver 300 generates a light source control signal to control a driving timing of the light source driver 400, and outputs the light source control signal to the light source driver 400. The panel driver 300 may be synchronized with the light source driver 400.

The light source part 200 generates light and provides the light to the display panel 100. The light source part 200 includes a first light source 210 and a second light source 220. In an exemplary embodiment, as shown in FIG. 11, the light source part 200 may be a direct type backlight assembly. In such an embodiment, the first light source 210 and the second light source 220 may be disposed under the display panel 100 and emit light to the display panel 100. In such an embodiment, the first light source 210 and the second light source 220 are alternately in a turned-on state.

The first light source 210 may generate one of light having the first primary color, light having the second primary color and light having the third primary color.

The second light source 220 may generate mixed light of two primary colors. In one exemplary embodiment, for example, when the first light source 210 generates the light having the first primary color, the second light source 220 may generate mixed light of the second primary color and the third primary color.

In an exemplary embodiment, the first light source 210 generates a red light. In such an embodiment, the second light source 220 generates a cyan light which is a mixed light of a green light and a blue light.

The light source driver 400 is connected to the light source part 200. The light source driver 400 drives the light source part 200. The light source driver 400 alternately turns on the first and second light sources 210 and 220. In one exemplary embodiment, for example, the first light source 210 is in a turned-on state and the second light source 220 is in a turned-off state during a first subframe. In one exemplary embodiment, for example, the first light source 210 is in a turned-off state and the second light source 220 is in a turned-on state during a second subframe.

The panel driver 300 sets the grayscale data of the first subpixel R, the second subpixel G and the third subpixel B.

During the first subframe, when the first light source 210 generating the red light is in a turned-on state, the first subpixel R may be a blue grayscale. During the first subframe, the second subpixel G and the third subpixel B may be in a turned-off state. In one exemplary embodiment, for example, the second subpixel G and the third subpixel B may represent black grayscales during the first subframe.

During the second subframe, when the second light source 220 generating the cyan light which is a mixed light of the green light and the blue light is in a turned-on state, the second subpixel G and the blue subpixel B may represent a green grayscale and a blue grayscale. During the second sub frame, the first subpixel R may be in a turned-off state. In one exemplary embodiment, for example, the first subpixel R may represent black grayscale during the second subframe.

According to an exemplary embodiment, as described above, the display panel 100 includes the red color filter, the green color filter and the blue color filter and the light source part 200 includes the red light source RL and the cyan light source CL which are alternately in a turned-on state such that the color reproduction ratio of the display panel 100 may increase.

In such an embodiment, the first light source 210 and the second light source 220 of the light source part 200 include the blue LED chip and do not include a red LED chip and a green LED chip such that a manufacturing cost of the light source part 200 may decrease.

According to exemplary embodiment of the invention as described herein, the display panel includes the first color filter, the second color filter and the third color filter and the light source part includes the first light source and the second light source which are alternately in a turned-on state such that the color reproduction ratio may increase.

The foregoing is illustrative of the invention and is not to be construed as limiting thereof. Although a few example embodiments of the invention have been described, those skilled in the art will readily appreciate that many modifications are possible in the example embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific example embodiments disclosed, and that modifies to the disclosed example embodiments, as well as other example embodiments, are intended to be included within the scope of the appended claims. The invention is defined by the following claims, with equivalents of the claims to be included therein.

What is claimed is:

1. A display apparatus comprising:

a display panel comprising a first subpixel comprising a first color filter having a first primary color, a second subpixel comprising a second color filter having a second primary color and a third subpixel comprising a third color filter having a third primary color; and a light source part which provides light to the display panel, wherein the light source part comprises a first light source which generates a first light having the first primary color and a second light source which generates a second light having a mixed color of the second primary color and the third primary color, wherein the first light source and the second light source are alternately in a turned-on state, wherein the first light source is in the turned-on state and the second light source is in a turned-off state during a first subframe, such that the first subpixel represents a grayscale of the first primary color and the second subpixel and the third subpixel represent a black grayscale during the first subframe, and wherein the second light source is in the turned-on state and the first light source is in the turned-off state during a second subframe, such that the second subpixel represents a grayscale of the second primary color, the third subpixel represents a grayscale of the third primary color and the first subpixel represents the black grayscale during the second subframe.

2. The display apparatus of claim 1, wherein the first primary color is green, the second primary color is red, the third primary color is blue, and the mixed color is magenta.

3. The display apparatus of claim 2, wherein the first light source comprises a first blue light emitting diode chip and a green phosphor, and the second light source comprises a second blue light emitting diode chip and a red phosphor.

4. A display apparatus comprising:

a display panel comprising a plurality of subpixels, wherein each subpixel comprises one of a first color filter having a first primary color, a second color filter having a second primary color and a third color filter having a third primary color; and a light source part which provides light to the display panel, wherein the light source part comprises a first light source which generates a first light having the first primary color and a second light source which generates a second light having a mixed color of the second primary color and the third primary color, wherein the first light source and the second light source are alternately in a turned-on state, wherein the first primary color is green, the second primary color is red, the third primary color is blue, and the mixed color is magenta, wherein the first light source comprises a first blue light emitting diode chip and a green phosphor, and the second light source comprises a second blue light emitting diode chip and a red phosphor, and wherein a density of the green phosphor is greater than a density of the red phosphor.

5. The display apparatus of claim 3, wherein a peak wavelength of the green phosphor is equal to or less than 540 nanometers, and a peak wavelength of the red phosphor is equal to or greater than 630 nanometers.

6. The display apparatus of claim 1, wherein the first primary color is red, the second primary color is green, the third primary color is blue, and the mixed color is cyan.

7. The display apparatus of claim 6, wherein the first light source comprises a first blue light emitting diode chip and a red phosphor, and the second light source comprises a second blue light emitting diode chip and a green phosphor.

8. A display apparatus comprising:

a display panel comprising a plurality of subpixels, wherein each subpixel comprises one of a first color filter having a first primary color, a second color filter having a second primary color and a third color filter having a third primary color; and a light source part which provides light to the display panel, wherein the light source part comprises a first light source which generates a first light having the first primary color and a second light source which generates a second light having a mixed color of the second primary color and the third primary color, wherein the first light source and the second light source are alternately in a turned-on state, wherein the first primary color is red, the second primary color is green, the third primary color is blue, and the mixed color is cyan, wherein the first light source comprises a first blue light emitting diode chip and a red phosphor, and the second light source comprises a second blue light emitting diode chip and a green phosphor, and wherein a density of the red phosphor is greater than a density of the green phosphor.

9. The display apparatus of claim 7, wherein a peak wavelength of the green phosphor is equal to or less than 540 nanometers, and a peak wavelength of the red phosphor is equal to or greater than 630 nanometers.

10. A method of driving a display apparatus, the method comprising:

setting grayscale data of a first subpixel of the display apparatus, which comprises a first color filter having a first primary color, setting grayscale data of a second subpixel of the display apparatus, which comprises a second color filter having a second primary color, and setting grayscale data of a third subpixel of the display apparatus, which comprises a third color filter having a third primary color; and alternately turning on a first light source of the display apparatus, which generates a first light having the first primary color, and a second light source of the display apparatus, which generates a second light having a mixed color of the second primary color and the third primary color;

wherein the alternately turning on the first light source and the second light source comprises:

turning on the first light source and turning off the second light source during a first subframe, such that the first subpixel represents a grayscale of the first primary color and the second subpixel and the third subpixel represent a black grayscale during the first subframe, and wherein the alternately turning on the first light source and the second light source further comprises:

turning on the second light source and turning off the first light source during a second subframe, such that the second subpixel represents a grayscale of the second primary color, the third subpixel represents a grayscale of the third primary color and the first subpixel represents the black grayscale during the second subframe.

11. The method of claim 10, wherein the first primary color is green, the second primary color is red, the third primary color is blue, and the mixed color is magenta.

12. The method of claim 11, wherein the first light source comprises a first blue light emitting diode chip and a green phosphor, and the second light source comprises a second blue light emitting diode chip and a red phosphor.

13. The method of claim 10, wherein the first primary color is red, the second primary color is green, the third primary color is blue, and the mixed color is cyan.

14. The method of claim 13, wherein the first light source comprises a first blue light emitting diode chip and a red phosphor, and the second light source comprises a second blue light emitting diode chip and a green phosphor.

* * * * *